United States Patent [19]

Payer

[11] Patent Number: 5,436,031
[45] Date of Patent: Jul. 25, 1995

[54] METHOD FOR IMPREGNATING A HEATED, FLAT, FIBROUS SUBSTRATE WITH SYNTHETIC RESIN

[75] Inventor: Helmut Payer, Maria Enzersdorf, Austria

[73] Assignee: Isovolta Osterreichische Isolierstoffwerke Aktiengesellschaft, Wiener Neudorf, Austria

[21] Appl. No.: 167,859
[22] PCT Filed: Jun. 24, 1992
[86] PCT No.: PCT/AT92/00080
§ 371 Date: Dec. 23, 1993
§ 102(e) Date: Dec. 23, 1993
[87] PCT Pub. No.: WO93/00209
PCT Pub. Date: Jan. 7, 1993

[30] Foreign Application Priority Data
Jun. 24, 1991 [AT] Austria ................................. 1261/91

[51] Int. Cl.⁶ .................. B05D 1/18; B05D 1/28; B05C 1/12; B05C 3/152
[52] U.S. Cl. ................................. 427/289; 427/428; 427/434.2; 118/202; 118/206; 118/419
[58] Field of Search .............. 427/289, 314, 316, 428, 427/434.2, 434.6, 391; 118/60, 67, 68, 40, 118, 122, 246, 419, 420, 423, 428, 202, 206

[56] References Cited

U.S. PATENT DOCUMENTS

| | | | |
|---|---|---|---|
| 1,854,192 | 4/1932 | Holcomb | 118/419 |
| 2,038,607 | 4/1936 | Sauer | 118/67 |
| 2,665,221 | 1/1954 | Grangaard | 118/419 |
| 4,397,909 | 8/1983 | Goddard et al. | 428/252 |
| 4,588,615 | 5/1986 | Otty | 427/294 |

FOREIGN PATENT DOCUMENTS

| | | |
|---|---|---|
| 0150570 | 8/1985 | European Pat. Off. . |
| 2442977 | 3/1976 | Germany ........................ 427/316 |
| 148628 | 6/1981 | Germany . |
| 63-116811 | 5/1988 | Japan ............................. 118/423 |

OTHER PUBLICATIONS

Database WPIL, Section Ch, Week 8325, Derwent Publications, Ltd., London, GB; Class A, AN 83-59678K & JP, A, 58 078 724 (Tokyo Shibabura Elec. Ltd.) 12 May 1983.

Patent Abstracts of Japan, vol. 8, No. 146 (M-307) 7 Jul. 1984 & JP, A, 50 042 923 (Matsushita Denko KK) 9 Mar. 1984.

Database WPIL, Section Ch, Week 8641, Derwent Publications, Ltd., London, GB; Class A, AN 86-267347 & JP, A, 61 192 740 (Shin Kobe Elec. Mach.) 27 Aug. 1986.

Database WPIL, Section Ch, Week 8951, Derwent Publications, Ltd., London, GB; Class A, AN 89-375599 & JP, A, 1 283 141 (Aika Kogyo Co., Ltd.) 17 Nov. 1989.

*Primary Examiner*—Terry J. Owens
*Attorney, Agent, or Firm*—Bacon & Thomas

[57] ABSTRACT

A method for impregnating a flat, fibrous substrate penetrated by a low viscosity, fluid synthetic resin, the substrate web 1 being preheated by known device 2 and thereupon being made to pass over a friction roller 3 which is heated where called for and which is uniformly wetted at its surface 6 with the low viscosity, aqueous synthetic resin solution based on an aminoplastic resin, substantially a melamine resin 5 or based on a phenolformaldehyde resin 5' present in a bath, the low viscosity, aqueous synthetic resin solution being uniformly heated and at least part of it penetrating the surface of the substrate web 1, whereupon the substrate web 1 loaded with synthetic resin is fully impregnated in the bath 4. Next this substrate web soaked with synthetic resin is made to pass through a metering device 7 and a drying channel 8 wherein the solvents of the aqueous, synthetic resin solution absorbed by the substrate are extensively evaporated in a flow of hot air and thereupon this substrate is cut to size in cutting device 9 into flat pieces 10 and is stacked in stacking device 11. The composites 10 are suitable to manufacture decorative cover layers, industrial insulating materials and core-layers of decorative molded laminates.

12 Claims, 2 Drawing Sheets

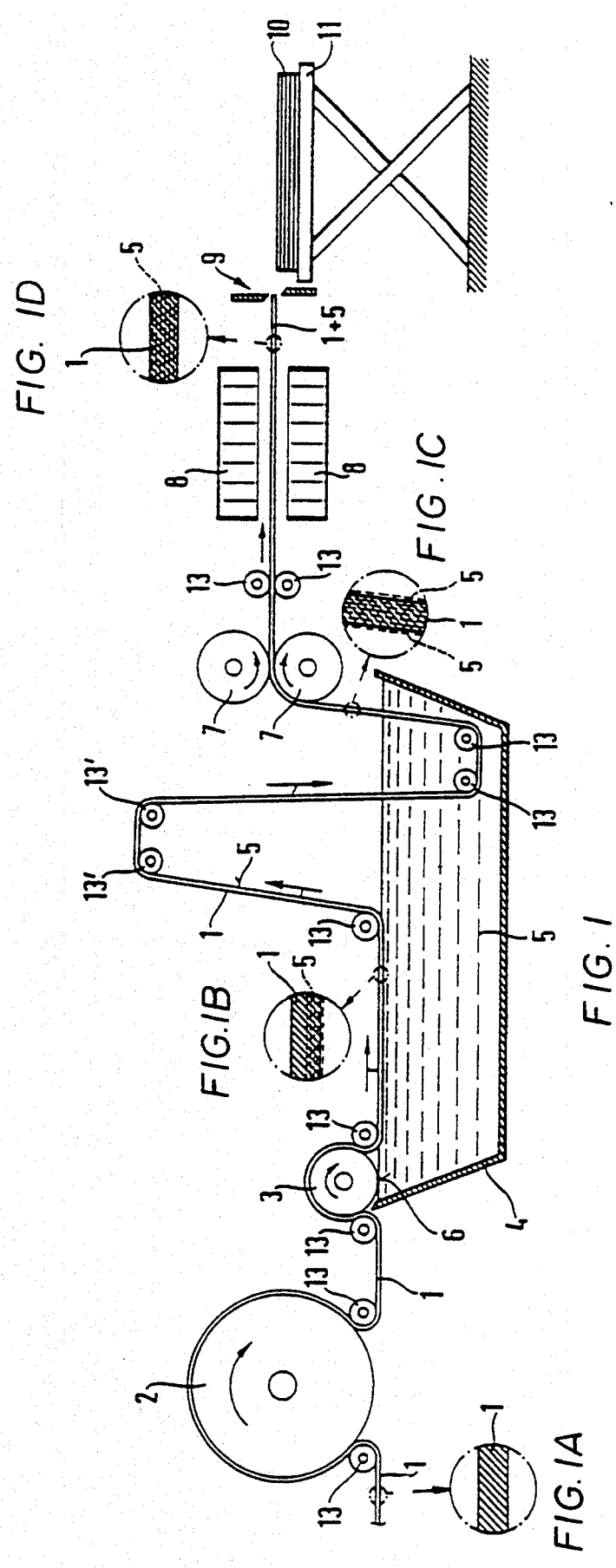

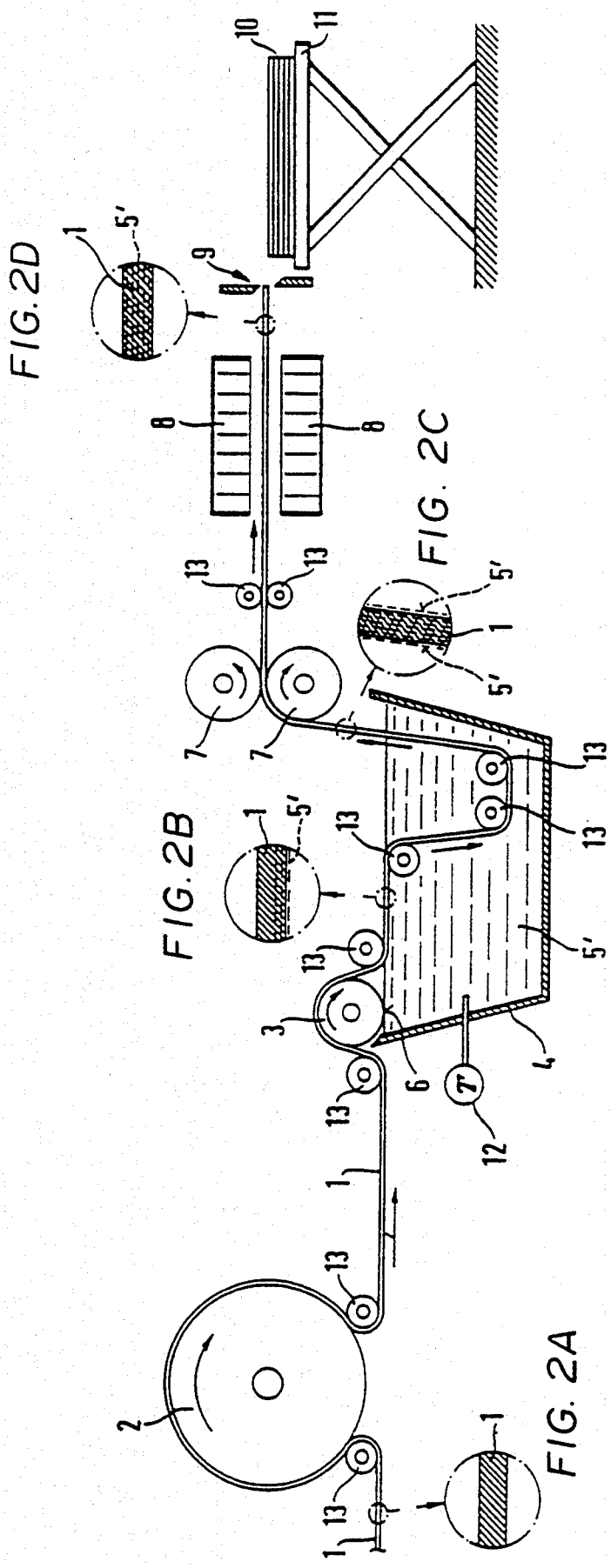

METHOD FOR IMPREGNATING A HEATED, FLAT, FIBROUS SUBSTRATE WITH SYNTHETIC RESIN

BACKGROUND OF THE INVENTION

1. Field of the Invention

The invention concerns a method for impregnating a flat, fibrous substrate penetrated by a fluid synthetic resin of low viscosity, products made using this method and apparatus with which to carry out the method.

2. Discussion of the Prior Art

It is known to lower the viscosity of the resin to be deposited on a substrate to achieve adequate impregnation. Illustratively this is done by adding solvents such as water or alcohols. When using paper, the addition of water to the resin mixture causes swelling of the substrate. The large amount of solvent required for swelling must be evaporated following impregnation; this condition requires substantial transit times in the drier and as a result limits on the capacity of the impregnating device.

It is further known from the Japanese patent document A 59-042923 to avoid an increase in viscosity during impregnation by preventing solvent evaporation from the bath by means of a cover. The substrate to be impregnated is guided by a scoop roller dipping into the bath and thereupon it is returned by direction-changing rollers into the resin bath.

SUMMARY OF THE INVENTION

The object of the invention is to create a method which reduces the quantities of solvents and hence the drying times, thereby shortening the transit times in the drier.

The object of the invention is achieved by the method of the invention in that the substrate web 1 is preheated by means 2 known per se and guided over and uniformly wetted, by a friction roller 3 which is heated when called for and is in contact with a low-viscosity, aqueous solution of synthetic resin 5, 5' in a bath 4, at the web surface 6 with said solution 5, 5', the low-viscosity, aqueous solution of synthetic resin being heated uniformly and at least part of the synthetic resin penetrates the surface of the substrate web 1, and in that thereupon the substrate web loaded with synthetic resin is fully soaked a,ad in that the substrate web impregnated with synthetic resin then passes through a metering device 7 and drying channel 8 wherein solvents of the aqueous, synthetic-resin solution absorbed by the substrate web are extensively evaporated in a flow of hot air, the said substrate web then being cut to size as flat pieces 10 in cutting means 9 and thereupon being stacked in a stacking means 11.

The aqueous solution of synthetic resin 5, 5' advantageously contains 0 to 30%-weight of lower alcohols.

The temperature of the friction roller 3 advantageously is kept constant in the range of 40' to 120° C.

The support web 1 advantageously is preheated to a temperature in a range from 40° to 95° C., illustratively using a heated roller. The aqueous, low-viscosity synthetic-resin solution 5 in the bath 4 advantageously may be based on an aminoplastic, such as melamine resin, kept at room temperature during the procedure. The proportion of aminoplastic or melamine resin advantageously is 45 to 65%-weight, the proportion of the aqueous solvents is 35 to 55%-weight.

The resin may be advantageously based on a phenol-formaldehyde resin 5' of which the proportion in the solution is 45 to 80%-weight and the proportion of aqueous solvents is 55 to 20%-weight. The phenol-formaldehyde-resin based synthetic-resin solution is advantageously kept constant at a temperature within the range of 30° to 80° C., preferably 40° to 50° C. by means of a temperature-regulating circuit 12. If the selected synthetic resin is based on an aminoplastic resin, substantially melamine resin 5, then the equipment to carry out the method of the invention is composed of several devices 13 to feed and change the direction of the support web 1, a preheating roller 2, a heated friction roller 3 and a bath 4, with deflection rollers 13' being mounted 1-2 meters above the bath. The apparatus moreover comprises a metering device 7, a drying channel 8, cutting means 9 and stacking means 11. The apparatus with which to carry out the method of the invention using a phenol-formaldehyde resin in the low-viscosity solution of synthetic resin 5' advantageously comprises several devices 13 to feed and change the direction of the support web 1, a preheating roller 2, a heated friction roller 3, a bath 4 connected to a temperature-regulating circuit 12, a metering device 7, a drying channel 8, cutting means 9 and stacking means 11.

A prepreg can be advantageously manufactured using a low-viscosity, aqueous solution of synthetic resin based on an aminoplastic resin, particularly melamine resin 5 in the method of the invention, the resin deposition being 90 to 250%, preferably 90 to 120%. Such prepregs are advantageously used for decorative covering layers of molded laminates.

Furthermore a prepreg with a resin deposit between 50 and 100% can be manufactured with the method of the invention using a phenol-formaldehyde resin solution 5' for application as industrial insulating materials.

Advantageously further prepregs can be manufactured that comprise substrates impregnated with phenol-formaldehyde resin, the resin deposit advantageously being 35 to 50%. These prepregs can be advantageously used in making core layers of decorative molded laminates.

BRIEF DESCRIPTION OF THE DRAWINGS

The invention is discussed below in relation to the below described Figures and two illustrative embodiments.

FIG. 1 shows several devices 13 to feed and change the direction of the substrate web 1, also a preheating roller 2, a heated friction roller 3, a bath 4 and direction-changing rollers 13' which are 1-2 meters above the bath 4, a metering device 7, a drying channel 8, cutting means 9 and stacking means 11.

FIGS. 1a, 1b, 1c and 1d show enlarged views of web 1 at each of the corresponding circled sections of FIG. 1 as indicated by an arrow from each circled section respectively to the corresponding FIGS. 1a, 1b, 1c and 1d.

FIG. 2 shows several devices 13 to feed and change the direction of the web 1, a preheating roller 2, a heatable deposition roller 3, a bath 4 and a metering device 7, a drying channel 8 and also cutting means 9 and stacking means 11.

FIGS. 2a, 2b, 2c and 2d show enlarged views of web 1 at each of the corresponding circled sections of FIG. 2 as indicated by an arrow from each circled section respectively to the corresponding FIGS. 2a, 2b, 2c and 2d.

DETAILED DESCRIPTION OF THE PREFERRED EMBODIMENT

The reference numerals recited in the below examples correspond to the reference numerals contained in FIGS. 1, 1a, 1b, 1c, 1d, 2, 2a, 2b, 2c and 2d. FIGS. 1a, 1b, 1c and 1d show enlarged views of web 1 at each of the corresponding circled sections of FIG. 1 as indicated by an arrow from each circled section respectively to the corresponding FIGS. 1a, 1b, 1c and 1d. Likewise, FIGS. 2a, 2b, 2c and 2d show enlarged views of web 1 at each of the corresponding circled sections of FIG. 2 as indicated by an arrow from each circled section respectively to the corresponding FIGS. 2a, 2b, 2c and 2d.

EXAMPLE 1

The method of the invention is carried out using a low-viscosity, aqueous solution of synthetic resin based on an aminoplastic, essentially melamine resin 5:

A melamine resin is adjusted to a solid content of 51% by being diluted with water and methanol. The viscosity of the this solution of impregnating resin was measured using a DIN-beaker; the ascertained value was between 16 and 17 seconds. This solution was transferred at room temperature into the bath 4.

A paper web 1 was made to move at a speed of 100 meters/min. over the preheating roller 2 of which the temperature was kept at 175° C. Thereby the paper was preheated to 95° C. This preheated paper web is made to pass over a friction roller 3 which is at a temperature of 50° C. and which by its surface 6 accepts resin. Thereupon the paper web is moved along the surface of the resin solution 5 which is kept at room temperature and thereby the paper web is cooled to 30° C. This path between the direction-changing rollers 13 is shown in FIG. 1 and thereby the synthetic resin partly penetrates the substrate web. Additional penetration is provided in that the pre-impregnated substrate web is air-dried along the path segments between the direction-changing rollers 13 and 13' of FIG. 1 and between the deflection rollers 13' and the surface of the synthetic-resin solution 5. Due to the chemical structure of the melamine resin 5, such a procedure is necessary to assure fiber penetration within this path extension. Lastly complete impregnation takes place in the bath 4 by complete immersion in the resin bath 5. The excess resin is wiped by the metering device 7 off the surface of the now created composite. The aqueous portions arising from the aqueous solvents are evaporated in the drying channel 8. At 9, the composites are cut to size and stacked (10) at the stacking means 11. Next they may be used for decorative cover layers in molded laminates. Thereupon they may be used in the manufacture of decorative cover layers of molded laminates provided resin deposit be illustratively set to 90 to 250%.

EXAMPLE 2

The method of the invention is carried out using a low-viscosity, aqueous phenol-formaldehyde resin solution 5':

A solid content of 71% of the phenol-formaldehyde resin is achieved by diluting several times with water and methanol. The viscosity of this solution was 165 MPa.s at 40° C. This low-viscosity solution was transferred into the bath and the temperature of 40° C. was maintained by means of the temperature control 12. As shown by FIG. 2, a substrate web 1 is made to pass over direction-changing rollers 13 and the preheating roller 2 of which the temperature is set at 175° C. Beyond the preheating roller the paper preheating amounts to about 95° C. Thereupon the preheated paper web is made to pass over a friction roller 3 of which the temperature is kept constant at 80° C. Then the paper web is made to pass over the surface of the resin solution 5', at which time it is already cooled to 60° C. This path segment shown in FIG. 2 is necessary because the synthetic resin is already able to penetrate the paper web. Complete penetration takes place when the pre-impregnated paper web 1 passes through the synthetic-resin solution 5'. A small resin bath 4 is used for this method in order that the phenol-formaldehyde resin be only briefly thermally stressed during the soaking stage. Again the metering device 7 removes the excess resin, then the aqueous solvents absorbed during soaking are removed in the drying channel 8, the composites are cut to size at 9 and stacked (10) at 11.

The products made by the method of the invention are applicable as composites in the manufacture of industrial insulating materials and for core layers of decorative molded laminates.

I claim:

1. A method for impregnating a flat, fibrous substrate with a low viscosity aqueous synthetic resin solution which contains from 45–65% weight of aminoplastic resin and from 35–55% weight of aqueous solvents comprising preheating a web of substrate material, passing said web over a heated friction roller which is uniformly wetted on its surface by contact with the low viscosity aqueous synthetic resin solution maintained in a bath at room temperature, whereby at least part of the synthetic resin penetrates the surface of the web, immersing the web in the bath to completely soak the web with the synthetic resin, removing excess synthetic resin from the web, drying the web and cutting the web into flat pieces.

2. The method defined in claim 1 wherein the aqueous solution of synthetic resin contains an alcohol in an amount from 0 to 30% weight.

3. The method defined in claim 1 wherein the temperature of the friction roller is kept constant in the range from 40° to 120° C.

4. The method defined in claim 1 wherein the substrate web is preheated to a temperature in the range from 40° to 95° C.

5. The method defined in claim 1 wherein the substrate web is preheated by a heated roller.

6. The method defined in claim 1 wherein said aminoplastic resin consists essentially of melamine resin.

7. A method for impregnating a flat, fibrous substrate with a low viscosity aqueous synthetic resin solution which contains from 45–80% weight of phenolformaldehyde resin and from 55–20% weight of aqueous solvents comprising preheating a web of substrate material, passing said web over a heated friction roller which is uniformly wetted on its surface by contact with the low viscosity aqueous synthetic resin solution contained in a bath, whereby the low viscosity aqueous synthetic resin solution is heated to a temperature in the range of 30° to 80° C. and at least part of the synthetic resin penetrates the surface of the web, immersing the web in the bath to completely soak the web with the synthetic resin, removing excess synthetic resin from the web, drying the web and cutting the web into flat pieces.

8. The method defined in claim 7 wherein the aqueous solution of synthetic resin contains an alcohol in an amount from 0 to 30% weight.

9. The method defined in claim 7 wherein the temperature of the friction roller is kept constant in the range from 40° to 120° C.

10. The method defined in claim 7 wherein the substrate web is preheated to a temperature in the range from 40° to 95° C.

11. The method defined in claim 7 wherein the substrate web is preheated by a heated roller.

12. The method defined in claim 7 wherein the temperature of the low viscosity aqueous solution is maintained in the range of 40° to 50° C.

* * * * *